(12) United States Patent
Pomp

(10) Patent No.: US 9,950,565 B2
(45) Date of Patent: Apr. 24, 2018

(54) QUICK CHANGE SYSTEM FOR WHEELS

(71) Applicant: iPEK International GmbH, Sulzberg (DE)

(72) Inventor: Dominik Pomp, Waltenhofen (DE)

(73) Assignee: IPEK INTERNATIONAL GMBH, Sulzberg (DE)

( * ) Notice: Subject to any disclaimer, the term of this patent is extended or adjusted under 35 U.S.C. 154(b) by 229 days.

(21) Appl. No.: 14/688,311

(22) Filed: Apr. 16, 2015

(65) Prior Publication Data

US 2015/0298503 A1 Oct. 22, 2015

(30) Foreign Application Priority Data

Apr. 16, 2014 (DE) .................. 20 2014 101 827 U

(51) Int. Cl.
| | |
|---|---|
| *B60B 37/10* | (2006.01) |
| *B60B 19/14* | (2006.01) |
| *B60B 27/06* | (2006.01) |
| *F16L 55/28* | (2006.01) |
| *B60B 3/14* | (2006.01) |
| *B08B 9/049* | (2006.01) |
| *E03F 9/00* | (2006.01) |
| *F16L 55/40* | (2006.01) |
| *E03F 7/12* | (2006.01) |

(52) U.S. Cl.
CPC .............. *B60B 37/10* (2013.01); *B60B 19/14* (2013.01); *B60B 27/065* (2013.01); *F16L 55/28* (2013.01); *B08B 9/049* (2013.01); *B60B 3/14* (2013.01); *B60B 3/142* (2013.01); *B60Y 2200/60* (2013.01); *E03F 7/12* (2013.01); *E03F 9/002* (2013.01); *F16L 55/40* (2013.01)

(58) Field of Classification Search
CPC B60B 3/001; B60B 3/14; B60B 3/147; B60B 3/18; B60B 27/02; B60B 27/06; B60B 27/065; B60B 37/10
USPC .................. 301/111.01, 121, 111.03, 111.04
See application file for complete search history.

(56) References Cited

U.S. PATENT DOCUMENTS

| 2,289,448 A | 7/1942 | Monroe |
|---|---|---|
| 2,589,556 A | 3/1952 | Kjerulff |

(Continued)

FOREIGN PATENT DOCUMENTS

| CN | 102444786 A | 5/2012 |
|---|---|---|
| DE | 2308925 A | 9/1973 |

(Continued)

OTHER PUBLICATIONS

English translation of the German search report issued for corresponding German Patent Application No. 10 2014 108 082.3 dated Nov. 8, 2014.

*Primary Examiner* — Jason Bellinger
(74) *Attorney, Agent, or Firm* — Myers Wolin, LLC

(57) ABSTRACT

A quick change system for carriage wheels comprising an axle adapter and a lock for axial locking of a wheel on the axle adapter, wherein the lock has at least one locking member and a release cooperating with the locking member, wherein the locking member axially locks the wheel on the axle adapter in a locking position, and the release and the locking member cooperate such that during moving of the release, the locking member can be brought from the locking position into a releasing position, in which the wheel is released axially.

26 Claims, 9 Drawing Sheets

(56) References Cited

U.S. PATENT DOCUMENTS

| | | | | |
|---|---|---|---|---|
| 3,963,361 | A | * | 6/1976 | Schenk .................. F16D 1/108 |
| | | | | 301/111.01 |
| 4,925,249 | A | * | 5/1990 | Auspelmyer ............ B60B 3/16 |
| | | | | 301/111.01 |
| 5,408,854 | A | | 4/1995 | Chiu |
| 5,494,340 | A | * | 2/1996 | Cheng ................... B60B 37/10 |
| | | | | 301/111.07 |
| 5,957,544 | A | * | 9/1999 | Hu ......................... B60B 37/10 |
| | | | | 280/47.38 |
| 6,464,305 | B2 | * | 10/2002 | Markling ............... B60B 37/10 |
| | | | | 264/271.1 |
| 8,147,005 | B2 | * | 4/2012 | Morris ................... B60B 37/10 |
| | | | | 301/111.01 |
| 8,444,228 | B2 | * | 5/2013 | Parker ................... B60B 37/10 |
| | | | | 301/111.03 |
| 8,944,524 | B1 | * | 2/2015 | Sheefel ................. B60B 37/10 |
| | | | | 301/111.01 |
| 2015/0114145 | A1 | * | 4/2015 | Pomp ..................... E03F 9/002 |
| | | | | 73/865.8 |

FOREIGN PATENT DOCUMENTS

| | | |
|---|---|---|
| DE | 10359245 A1 | 6/2005 |
| DE | 202013104734 U1 | 11/2013 |

\* cited by examiner

QUICK CHANGE SYSTEM FOR WHEELS

CROSS REFERENCE TO RELATED APPLICATIONS

This application claims priority under 35 U.S.C. § 119 to German Application No. 20 2014 101 827.1, filed on Apr. 16, 2014, the contents of which are hereby incorporated by reference herein.

FIELD OF THE INVENTION

The invention relates to a changing system of carriage wheels of an inspection vehicle for quickly changing carriage wheels, a wheel for a quick change system as well as an inspection vehicle having a number of quick-change systems according to the invention.

BACKGROUND OF THE INVENTION AND PRIOR ART

For the inspection of conduits, in particular, of sewage pipes, connecting conduits, or other sewage water related plants, usually, a self-propelled vehicle or inspection vehicle is employed. Similar vehicles or carriages are also employed for cleaning purposes in the conduits. For this, the inspection vehicles or cleaning vehicles have wheels, by means of which they accomplish the moving of the vehicle within the conduit or within the sewage pipe. Depending, for example, on the conduit or pipe diameter, the inspection or cleaning vehicle has to be equipped with wheels, which preferably have tires adapted to the pipe or conduit diameter. Hereby, it is desirable to arrange the tires at the carriage axes releasably, in order to enable a changing of the tires such that an inspection or cleaning vehicle may be used in different conduits or pipes.

In prior art, it is known to fix the wheels of an inspection or cleaning vehicle by means of one or more screws to the carriage axle. This, however, has the disadvantage that, on the one hand, tools for loosening the screws are required, and, on the other hand, the screws which have been detached may be lost such that down times of the inspection or cleaning vehicle may occur.

Moreover, the changing of the carriage wheels takes a certain time, because for each wheel, the respective fixation screws have to be detached and, after the changing of the wheel, have to be screwed in again. A further disadvantage is that, as far as the tools necessary for the wheel change are not available, a wheel change may not be performed at all.

Object of the Invention

Therefore, it is an object of the present invention, to provide solutions, by means of which wheels of an inspection or cleaning vehicle, in particular, a conduit inspection and/or conduit cleaning system, may be changed faster, in a more convenient manner, safer, and in particular, without any tools.

Solution According to the Invention

According to the invention, this object is solved by a quick change system for carriage wheels, in particular, for carriage wheels of an inspection vehicle, in particular, conduit inspection and/or conduit cleaning vehicle, a wheel for a quick change system according to the invention, a quick change means with a quick change system according to the invention, and a wheel according to the invention, as well as an inspection vehicle having a number of quick change systems according to the invention, according to the independent claims. Preferred embodiments and further developments of the invention are defined in the respective dependent claims.

Accordingly, a quick change system for carriage wheels, in particular, carriage wheels of an inspection vehicle, in particular, a conduit inspection and/or conduit cleaning vehicle, is provided comprising an axle adapter and a locking means for axially locking a wheel on the axle adapter, wherein the locking means comprises at least one locking member and a releasing means cooperating with the locking member, wherein the at least one locking member in a locking position locks the wheel on the axle adapter axially, and the releasing means and the at least one locking means cooperate such that during moving the releasing means, the at least one locking means can be brought from the locking position into a releasing position, in which the wheel is released axially.

Preferably, the releasing means is movable in axial direction along the longitudinal axle of the quick change system. Alternatively, the releasing means may also be rotatable about the longitudinal axle of the quick change system, in order to bring the at least one locking member from the locking position into the releasing position.

Thereby, it is possible to detach a wheel, as for example, a wheel rim, from the axle adapter in a tool-free manner. For this, only the releasing means has to be moved in axial direction, or about its longitudinal axle, in order to bring the at least one locking member into a releasing position. The moving in axial direction may, for example, be accomplished by pressing onto the releasing means.

It is preferable, if a through hole is provided in a side wall of the axle adapter, in which the locking member is arranged movably with respect to the through hole, wherein in the locking position, the locking member at least partially protrudes from the through hole, and thereby, locks the wheel axially.

The at least one locking member may comprise a pin, a pivot, at least one ball, a hook, or a magnet.

The pin or the pivot may have at least one wall-sided recess, which basically runs transversely to the longitudinal axle of the pin or the pivot.

It is advantageous, if the wall-sided recess has a slanted side wall, which is arranged or runs at an angle with respect to the transverse axle of the pin or the pivot.

The releasing means may be configured as a releasing cap with a circumferential side wall, wherein the releasing means can be arranged with respect to the axle adapter such that the side wall of the releasing means at least partially is arranged within the side wall of the axle adapter, and that the releasing cap is movable in axial direction along the longitudinal axle of the quick change system relative to the axle adapter.

At least one edge-sided slot may be provided in the side wall of the releasing cap, with which the pin or the pivot may be brought into engagement in the area of its wall-sided recess. The width of the slot, hereby, preferably is smaller than the diameter of the slot or the pivot.

The releasing cap and the pin or the pivot preferably cooperate such that during moving the releasing cap in axial direction, an end portion of the slot acts on the slanted side wall of the wall sided recess of the pin or the pivot, and thereby, moves the pin or the pivot radially inwards.

Thereby, it is advantageously enabled that the wheel can be taken off the axle adapter tool-less, because the locking members or pins or pivots moved radially inwards are in a releasing position, and thereby, the wheel is released axially.

Thereby, it is advantageously enabled to detach a wheel tool-less from the axle adapter as well as also to attach it on the axle adapter tool-less.

According to an embodiment, a spring member is assigned to the locking member, the spring force of which presses the locking member radially outwards. Thereby, it is ensured that a wheel fitted on the axle adapter is locked axially automatically.

If balls are provided as locking members, it is advantageous, if the balls, in the locking position, engage with a recess at the inner wall of the wheel. A spring member may also be assigned to the balls, which pushes the balls radially outwards.

If balls are provided as locking members, it is advantageous, if a recess is provided at the outer wall of the side wall of the releasing means, wherein the depth of the recess increases in radial direction, and wherein the balls may be brought into engagement with the recess.

When using balls as locking members, it is advantageous, if during an axial movement of the releasing means relative to the axle adapter, and
   in the direction to lower depths of the recess of the releasing means, the ball can be brought in the releasing position, and
   in the direction to greater depths of the recess of the releasing means, the recess causes a movement of the ball into the locking position.

According to an embodiment of the invention, the axle adapter has a coaxial guide bolt, which in axial direction engages with a recess of the releasing means provided for this.

Blind holes may be provided in the guide bolt for receiving the spring member.

Preferably, the blind holes are arranged coaxially with respect to the through holes of the side wall of the axle adapter. The blind holes preferably have the same diameter as the through holes. Thereby, it is ensured that the locking members arranged within the through holes may be displaced against the spring force of the spring member at least partially into the blind hole.

According to a preferred embodiment of the quick change system according to the invention, the releasing means forms a push button for axially releasing the wheel, wherein by pushing the push button, the releasing members may be brought from a locking position into a releasing position or the locking members are released, so that the latter may be brought from a locking position into a releasing position.

According to a preferred embodiment of the quick change system according to the invention, the side wall of the axle adapter has, at least up to a predetermined height, an external profile, which corresponds to an internal profile of the wheel, and which prevents a rotation of the wheel about the longitudinal axle of the quick change system relative to the axle adapter. Thereby, the wheel is locked on the axle adapter radially, wherein also for this, no tools are necessary at all.

According to a preferred embodiment, the external profile is configured elliptical, polygonal, triangular, or multiangular, star-shaped, gearwheel-shaped, or circular with a radial feather key.

The wheel respectively has a corresponding internal profile. Further, a wheel for the inventive quick change system is provided by the invention, whereby the wheel at an inner wall has an at least partially circumferential recess, with which the locking members of the quick change system can be brought into engagement and lock the wheel axially, if the quick change system is fitted on the axle adapter of the quick change system axially.

The recess may have a substantially semi-circular cross-section. This cross-section is of advantage, if balls are used as locking members of the quick change system.

According to an embodiment of the wheel according to the invention, the circumferential recess may have two opposing side walls, whereby a side wall lying axially inwards of the two side walls is inclined about a first angle with respect to the transverse axle of the wheel, which is smaller than 90°. Thereby, it is enabled that a locking member, for example, a pivot or a pin, during the fitting of the wheel onto the axle adapter, is pushed into the circumferential recess slowly.

The locking member of the quick change system may be inclined about a second angle with respect to the transverse axle of the wheel, which is smaller than 90°, whereby the first angle is larger than the second angle. Thereby, it is ensured that the wheel fitted on the axle adapter has no clearance in axial direction.

It has been found to be advantageous, if the difference between the first angle and the second angle is selected such that a force fit is achieved in the locking position between the side wall lying axially inwards and the locking member, which prevents a loosening of the wheel from the axle adapter.

The side facing the axle adapter or the carriage axle of the wheel may have an internal profile, which corresponds to the external profile of the axle adapter of the quick change system, and which prevents a rotation of the wheel about the longitudinal axle of the quick change system relative to the axle adapter.

Further, a quick change means is provided by the present invention comprising an inventive quick change system and an inventive wheel corresponding to the inventive quick change system.

Further, an inspection vehicle, in particular, conduit inspection and/or conduit cleaning vehicle is provided having a number of inventive quick change systems.

The quick change systems preferably are attached at the axles of the inspection vehicle.

According to an embodiment of the invention, the quick change systems may be attached at the wheel axles releasably, for example, by means of a screw connection.

At an end portion of the axle, a radial pivot may be arranged, which may be engaged in a corresponding recess of the axle adapter of the quick change system, and which prevents a rotation of the quick change system about the longitudinal axle of the axle relative to the axle.

The invention specifically brings about the advantage that wheels or carriage wheels can be mounted, demounted or replaced tool-less. Because the loosening of screw connections for taking the carriage wheels or the wheels off is omitted, and because the carriage wheel to be mounted only has to be pushed onto the carriage axle and for demounting the carriage wheel only has to be displaced in axial direction, a wheel change is substantially faster accomplishable than with respect to carriage wheels known from prior art.

Because no screws or other releasable parts are present at the quick change system or at the wheel, these also cannot be lost such that down times may be substantially reduced.

A further specific advantage is that all movable members are arranged at or in the quick change system, while the wheel, which is fitted on the axle adapter of the quick change system does not have any movable parts and preferably is configured as one part or one piece, substantially reducing the production costs or the manufacturing expense for wheels according to the invention.

BRIEF DESCRIPTION OF THE FIGURES

Further details and features of the invention as well as concrete, in particular, preferred embodiments of the invention can be derived from the subsequent description in connection with the drawing, in which.

DETAILED DESCRIPTION OF THE INVENTION

Figure 1:
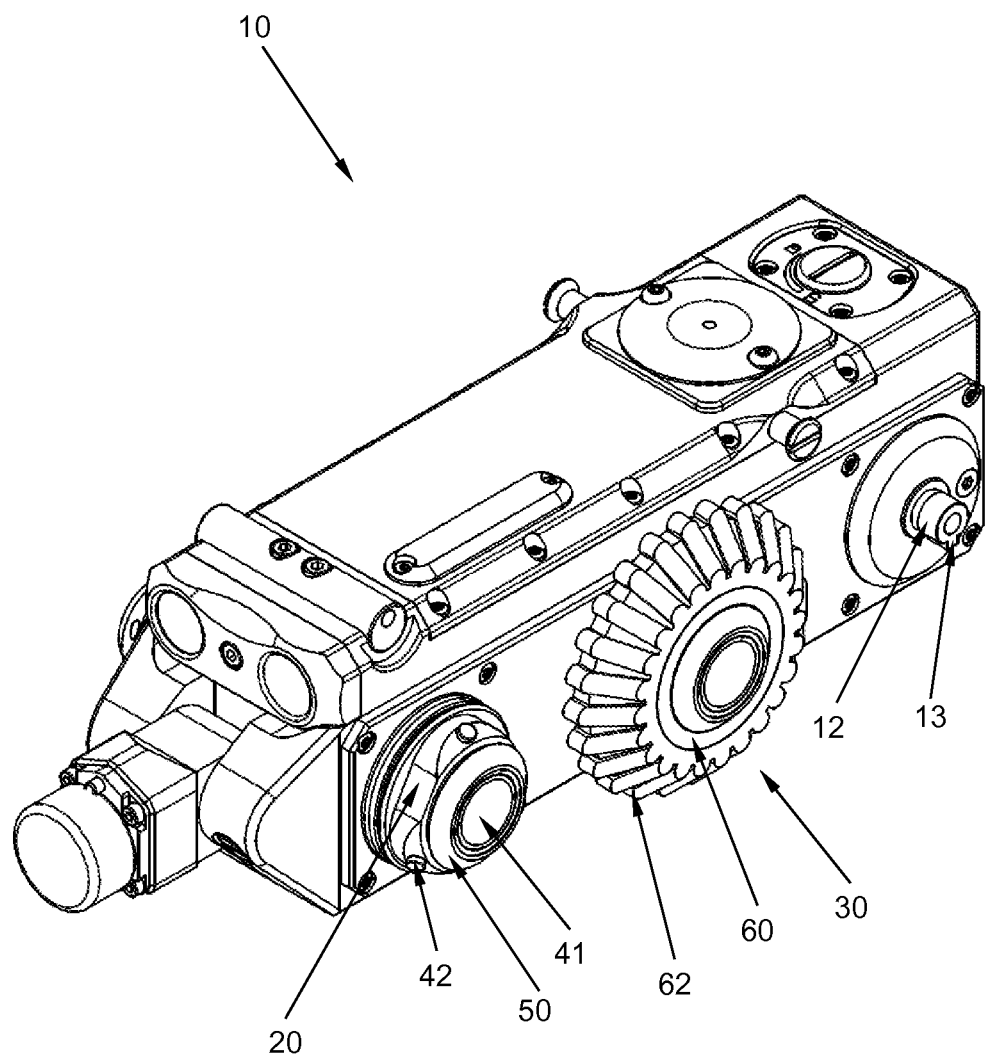
FIG. 1 shows an example of an inspection or cleaning vehicle having three carriage axes for illustration of the basic principle of the quick change system according to the invention.

FIG. 1 shows an example of an inspection or cleaning vehicle 10, which for example, may be configured as camera vehicle 10 for the inspection of conduits or pipes. With respect to the illustration of the inspection or cleaning vehicle 10 shown in FIG. 1, only the elements of the inspection vehicle which are essential for the invention are shown. The inspection or cleaning vehicle 10 may comprise further superstructures or extensions not shown here.

The inspection or cleaning vehicle 10 shown in FIG. 1 has three wheel or carriage axes 12. Of course, the inspection or cleaning vehicle 10 may also comprise more or less than three carriage axes 12.

At the free end, the substantially cylindrical carriage axle 12 has a radial pivot 13, which serves as anti-rotation lock for an axle adapter 20 of the quick change system 30 according to the invention fitted on the carriage axle 12. The axle end section of the carriage axle 12 may, however, also have a rectangular or square cross section such that an anti-rotation lock of a fitted axle adapter 20 is already realized due to the geometry of the axle, and the radial pivot 13 shown here may also be omitted.

In the example shown in FIG. 1, an axle adapter 20 is arranged at the left wheel axle, which is connected to the carriage axle 12 fixedly by means of a non-visible screw. Further, at the left wheel axle or at the axle adapter 20, an axial locking means is arranged, wherein in FIG. 1, a part of the releasing means 41 and the locking members 42 of the axial locking means are visible.

At the axle adapter 20 or at the releasing means 41, a cover lid 50 is arranged, which has a circular opening, into which the locking means 41 protrudes, and which prevents that the releasing means 41 can be released from the axle adapter 20.

The wheel 60 is fitted on the axle adapter 20 until abutment, whereby the fitted wheel 60 is locked by means of the locking members 42 axially such that the wheel 60 will not become loose autonomously. The locking members 42, hereby, engage into the recesses of the wheel provided for this.

By the geometry of the axle adapter 20 and the internal profile of the wheel 60, it is, moreover, ensured that the mounted wheel 60 may not rotate relative to the axle adapter 20 about the longitudinal axle of the carriage axle.

A wheel 62 is arranged at the wheel 60, whereby by operating the releasing means 41, as will be described in the following in further detail, the wheel 60 may be detached with the tire 62 from the axle adapter 20. The tires 62 may have different external diameters or different profiles.

By the quick change system 30 according to the invention it is advantageously possible that the mounting and the demounting of a wheel, i.e., a wheel with the tire arranged thereon may be accomplished completely tool-less, thereby substantially reducing set up times.

Figure 2:
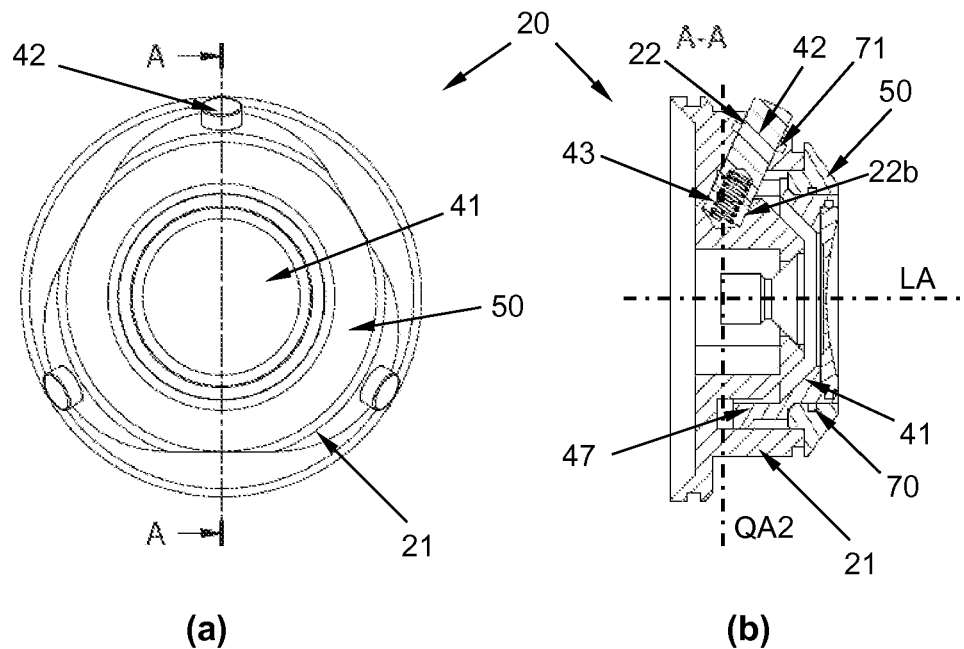
FIG. 2 shows an axle adapter according to the invention in a front view, in a side view, in a sectional view, and in a perspective view, wherein also the axial locking means is shown.
Figure 2:
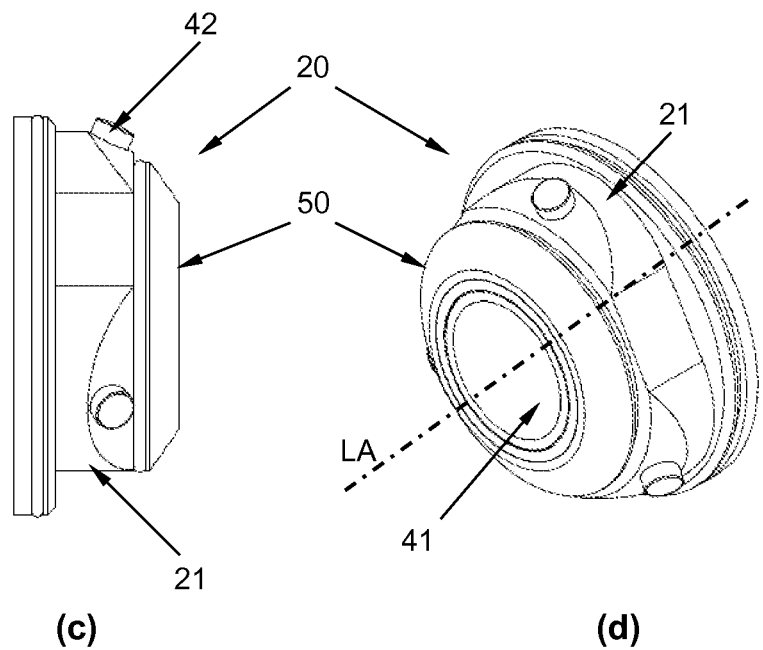

FIG. 2 shows a quick change system according to the invention with an axle adapter and a locking means arranged thereon, whereby in figure (a) a front view, in figure (b) a sectional view along the sectional axis A-A, in figure (c) a side view, and in figure (d) a perspective view of the quick change system are shown.

The quick change system according to the invention comprises an axle adapter 20, which is fixed to the carriage axle, whereby the axle adapter may be connected to the carriage axes releasably or fixedly. Further, the quick change system according to the invention comprises a locking means, which comprises a number of locking members 42 and a releasing means 41 cooperating with the locking members 42. The locking members 42 may be brought from a locking position into a releasing position by means of the releasing means 41, as will be described in further detail with reference to FIG. 7.

Figure 11:
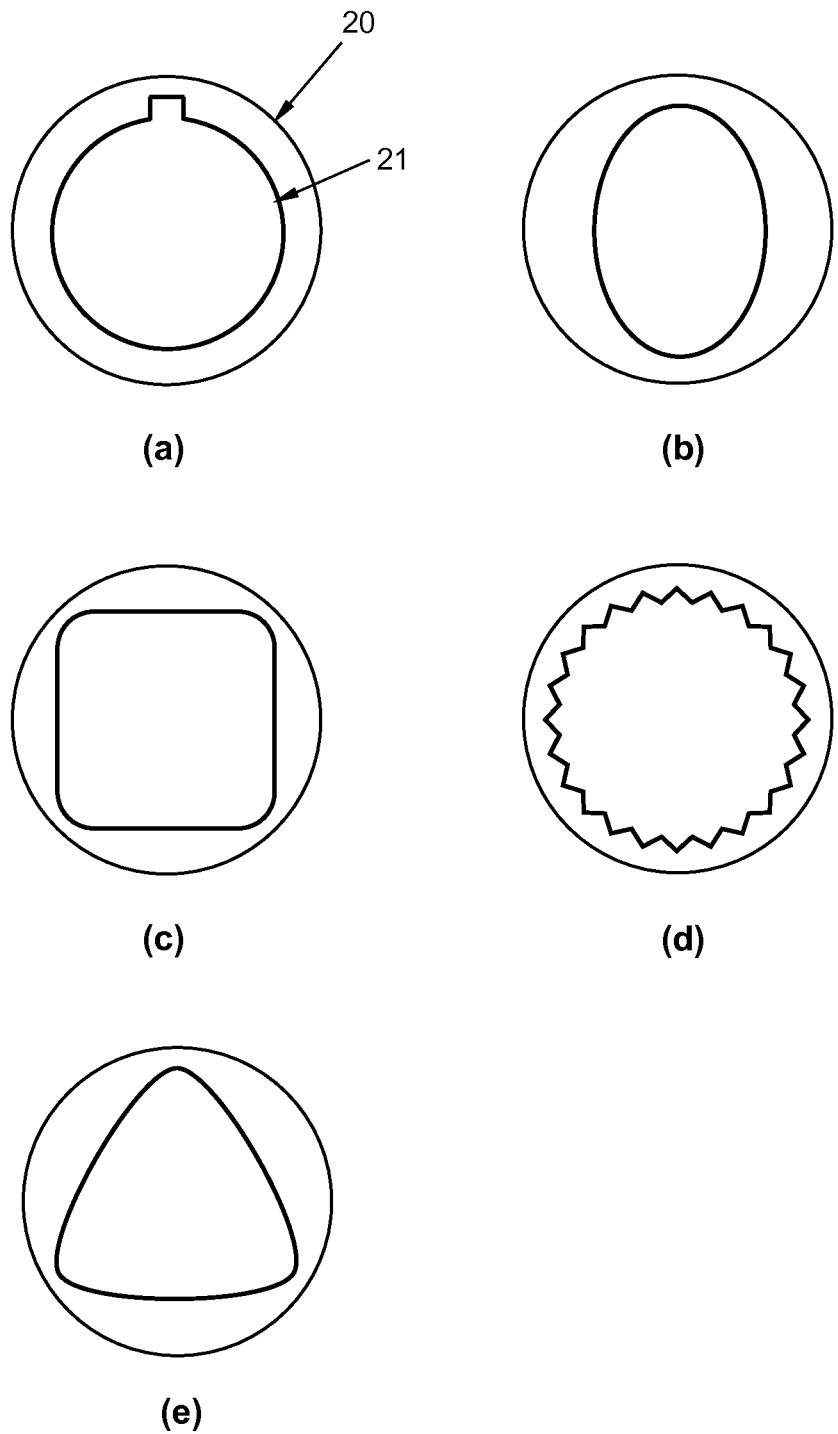
FIG. 11 shows several embodiments for external profiles of the side wall of the axle adapter according to the invention or for internal profiles of a wheel according to the invention.

The axle adapter 20 has a circumferential side wall 21, whereby the side wall may have a circular external profile. It is, however, preferable, if a lower section, i.e., a portion of the side wall 21 facing the carriage axle does not have a circular shaped external profile, but rather an external profile, which prevents a rotation of the wheel fitted on the axle adapter 20 about the longitudinal axis LA of the axle adapter relative to the axle adapter. With respect to the embodiment shown in FIG. 2, the side wall 21 has an external profile with three substantially straight sections, whereby respectively two straight sections are connected by a curved section. The geometry of the external profile of the side wall 21, thus, forms an effective anti-rotation lock of the wheel against the axle adapter. Further geometries of the side wall 21 of an axle adapter according to the invention are shown in FIG. 11.

In the side wall 21 of the axle adapter, through holes or through bores 22 are provided, whereby in each through hole 22, a locking member 42 is arranged. With respect to the embodiment shown in FIG. 2, the through holes 22 have a circular cross section. The locking members 42 are configured as cylindrically shaped pivots or pins. According to the invention, the locking members 42 are arranged movable relative to the through hole 22 within the through hole 22, whereby the locking members 42 are movable from a locking position into a releasing position. If the locking members 42 are in a locking position, they protrude at least partially from the through hole 22, and engage with a recess provided at the wheel 60, such that the locking members 22 of the wheel lock axially.

With respect to the embodiment shown in FIG. 2, a number of spring members 43 are provided, whereby a spring member 43 is assigned to each locking member 42. The spring force of the spring member 43 causes the locking member 42 which is assigned to it to be pushed substantially radially outwards. Thereby, it is enabled that the wheel, after the complete fitting onto the axle adapter, is locked axially automatically.

With respect to the embodiment shown in FIG. 2, the quick change system comprises three locking members 42. Depending on the requirements, however, also more or less than three locking members 42 may be provided. Preferably, the locking members 42 are arranged in circumferential direction uniformly distributed.

With respect to the embodiment shown in FIG. 2, the through holes 22 and the locking members 42 are inclined by a certain angle with respect to the transversal axis QA2, bringing about specific advantages, as will be described in further detail with reference to FIG. 8 and FIG. 9.

The external end section of the locking members 42 is configured such that during fitting the wheel on the axle adapter, the latter are pushed by the wheel against the spring force of the spring member 43 radially inwards, as will be described in further detail with reference to FIG. 8.

Further, the releasing member 42 has a blind boring or blind hole at the interior end section, into which the spring member 43 at least partially engages. The end section of the spring member 43 opposing the locking member 42 at least partially engages with an internal section 22b of the through hole 22, whereby the through hole 22 at least partially is interrupted by a circumferential moving space 25.

A releasing means 41 of the locking means is arranged at the axle adapter 20, whereby the releasing means 41 is movable in axial direction along the longitudinal axis LA.

The releasing means 41 has a circumferential side wall 47, which is arranged within the side wall 21 of the axle adapter 20, and which engages into the circumferential moving space 25. According to the invention, the releasing means 41 cooperates with the locking members 42 such that upon moving the releasing means 41 in axial direction along the longitudinal axis LA, the locking members can be brought from the locking position into a releasing position, in which the wheel is axially locked and may be detached from the axle adapter 20. The cooperation of the releasing means with the locking members will be described in further detail with reference to FIG. 7.

Further, a cover cap 50 is arranged at the axle adapter 20, which secures the releasing means 41 at the axle adapter. The cover cap 50 has an opening, into which the releasing means 41 protrudes at least partially such that the releasing means 41 may be operated from the outside manually.

The cover cap 50 may be fixed to the side wall of the axle adapter 20 by means of fixing screws. Alternatively, the cover may also be screwed onto the axle adapter by means of a screw threading.

In the area, into which the releasing means protrudes into the opening of the cover cap 50, the cover has a circumferential sealing member 70, in order to avoid that dust or liquid enters the interior of the axle adapter 20. Corresponding circumferential sealing members are also provided in the through holes 22 such that no dust or liquid may reach the interior of the axle adapter 20 also between the wall of the through hole and the wall of the locking members.

The axle adapter 20, the releasing means 41, the locking member 42, and the cover cap 50 may be made from a stable, preferably highly stable, plastic material. Alternatively, these members of the quick change system according to the invention may also be made from a metal. According to an embodiment of the invention, the quick change system according to the invention may also be produced in a 3-D printing procedure.

Figure 3:
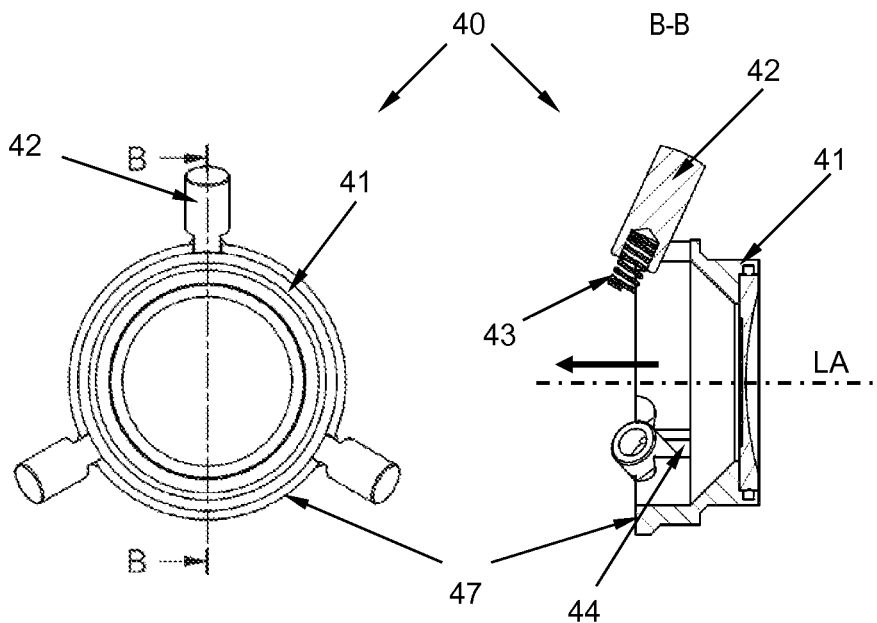
FIG. 3 shows an axial locking means according to the invention in a front view, a sectional view, in a perspective view diagonal from behind, and in a perspective view diagonal from the front.
Figure 3:
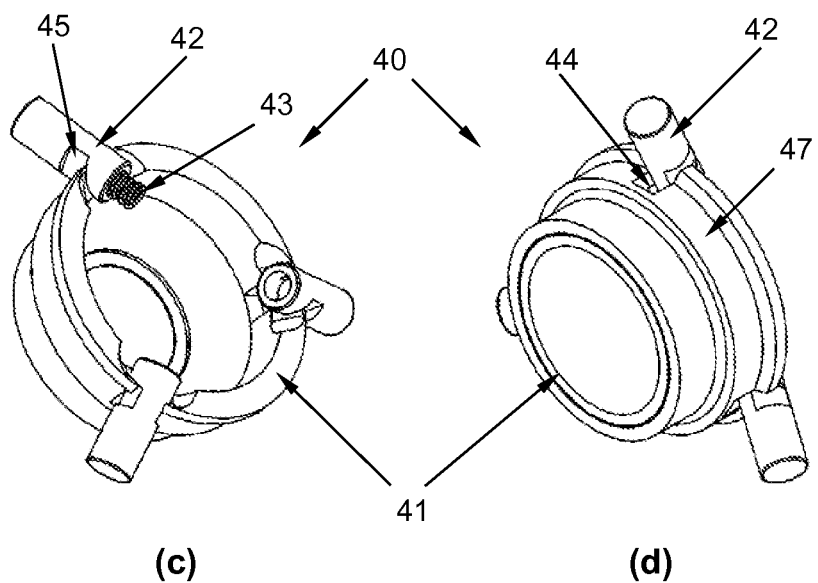

FIG. 3 shows a locking means 40 according to the invention, wherein in figure (a) a front view, in figure (b) a sectional view, in figure (c) a perspective view from behind, and in figure (d) a perspective view from the front are shown.

The locking means 40 according to the invention comprises a number of locking members 42 and a releasing means 41 cooperating with the locking members. Upon moving the releasing means 41 in axial direction along the longitudinal axis LA inwards (indicated by the arrow), the locking members 42 are brought from a locking position into a releasing position or the locking members 42 are released such that they may be brought into a releasing position.

As can be seen in FIG. 3, the releasing means has a substantially circular cross-section (other cross sections are also possible), wherein edge-sided slots 44 are provided in the side wall 47 of the releasing means 41. The locking members 42 have wall-sided recesses 45, wherein the locking members, in the region of these recesses 45, are brought into engagement with the slots 44.

The recesses 45 of the locking members 42 have a side wall, which is inclined with respect to the transverse axle of the locking member in a certain angle. During pressing of the releasing means 41 or during moving the releasing means 41 in axial direction along the longitudinal axis LA (illustrated in FIG. 3 by the arrow in figure (b)), an end section of the slot 44 is pushed against the inclined side wall of the recess 45, whereby the locking member 42 is pushed radially inwards.

The releasing member 41, here, has a circular cross section. In an alternative embodiment, the releasing means 41 may also have another cross section, according to which also a number of edge-sided slots 44 are provided in the side wall 47.

Figure 4:
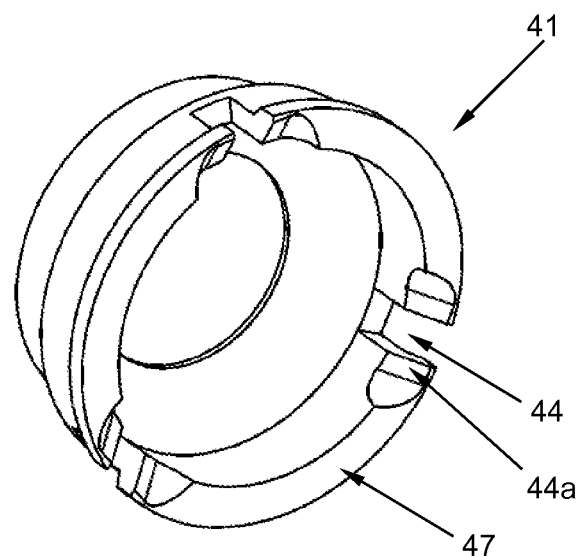
FIG. 4 shows a releasing means of an axial locking means according to the invention in a perspective view.

FIG. 4 shows a releasing means 41 according to the invention in a perspective view from behind or from below. Here, the slots 44 provided in the side wall 47 can be clearly seen, wherein the slots 44 or the side walls of the slots 44 have end portions 44a, which are brought into engagement with the recesses 45 of the locking members 42. The end portions 44a, here, are configured so as to slope inwards, wherein the angle of the end portions 44a substantially corresponds to the angle of the inclined side wall of the recess 45 of the respective locking member 42.

The releasing means 41 preferably is configured in one part or one piece.

Figure 5:
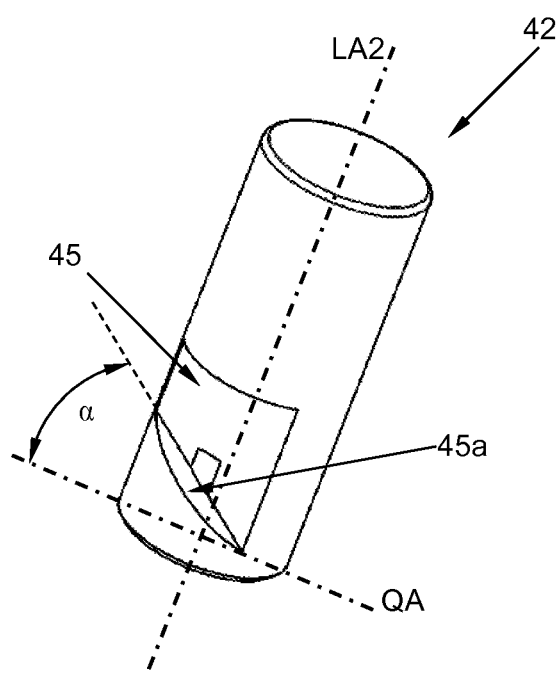
FIG. 5 shows an example of a locking member of an axial locking means according to the invention in a perspective view.

FIG. 5 shows an embodiment of a locking member 42 according to the invention. The locking member 42, here, is configured as a pivot or bolt, and has a substantially cylindrical shape with a circular cross-section. A recess 45 is provided at the pivot 42 wall-sidedly, wherein preferably two opposing recesses 45 configured identically are provided. By the recess 45, two side walls are formed, wherein at least a side wall 45a has an angle α with respect to the transverse axis QA of the locking member 42. The inclined configuration of the side wall 45a is necessary, in order to push the locking member 42 during moving of the releasing means 41 radially inwards.

The locking member 42 may also have another cross section than a circular cross-section. It is only important that a recess 45 is provided at the locking member 42, which has at least one inclined side wall 45a.

Figure 6:
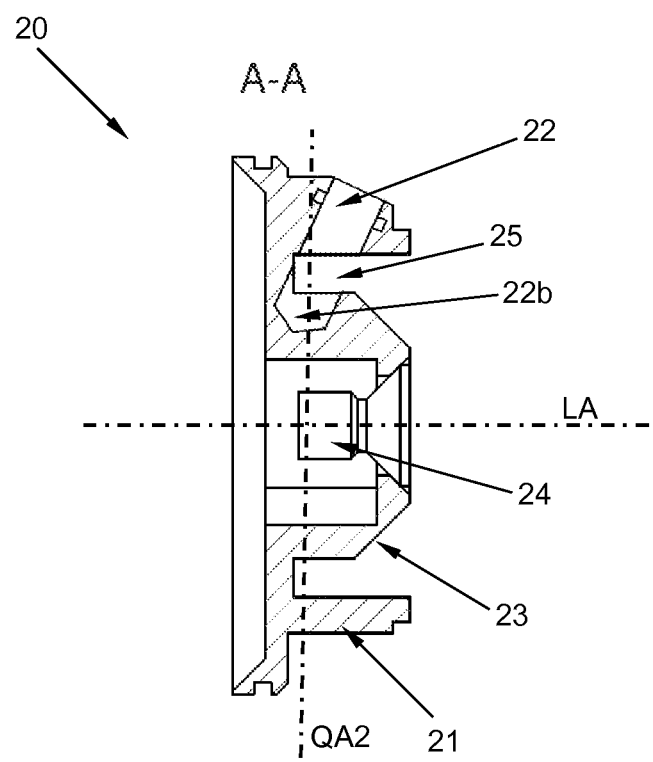
FIG. 6 shows a sectional view of an axle adapter according to the invention.

FIG. 6 shows an axle adapter 20 according to the invention in a sectional view along the sectional axis A-A (see FIG. 2).

Here, the through hole 22 provided in the side wall 21, which extends up to a guide bolt 23 arranged within the side wall, can be clearly seen, wherein the portion 22b of the through hole 22 lying in the guide bolt 23 is configured as blind hole or blind bore. In the blind bore 22b, the spring member 43 is arranged. If the locking member arranged in the through hole 22 is pushed radially inwards during releasing, an internal portion of the locking member can be pushed also into the blind hole 22b, whereby a safe guidance of the locking member is ensured.

Between the guide bolt 23, which is configured substantially cylindrically shaped, and the circumferential side wall 21 of the axle adapter 20, a circumferential moving space 25 is formed, with which the side wall 47 of the releasing means 41 at least partially engages. The guide bolt 23, hereby, forms a guide for the releasing means 41, if the latter is moved in axial direction relative to the axle adapter 20.

An axial bore 24 may be provided in the guide bolt 23, into which a fixation screw for fixing the axle adapter to the wheel axle 12 may be inserted.

As can also be seen in FIG. 6, the through hole 22 is inclined outwards by a certain angle with respect to the transverse axle QA2 of the axle adapter 20. This has certain advantages, as will be described in further detail with respect to FIG. 9. In an alternative embodiment, the longitudinal axle of the through hole 22 may also run parallel to the transverse axle QA2 of the axle adapter 20. Hereby, however, the external end portion of the locking member 42 has to be configured differently, in order to ensure a moving of the locking member radially inwards during the fitting of the wheel on the axle adapter 20 optimally.

The axle adapter 20 may also be configured as one part or as one piece.

Figure 7:
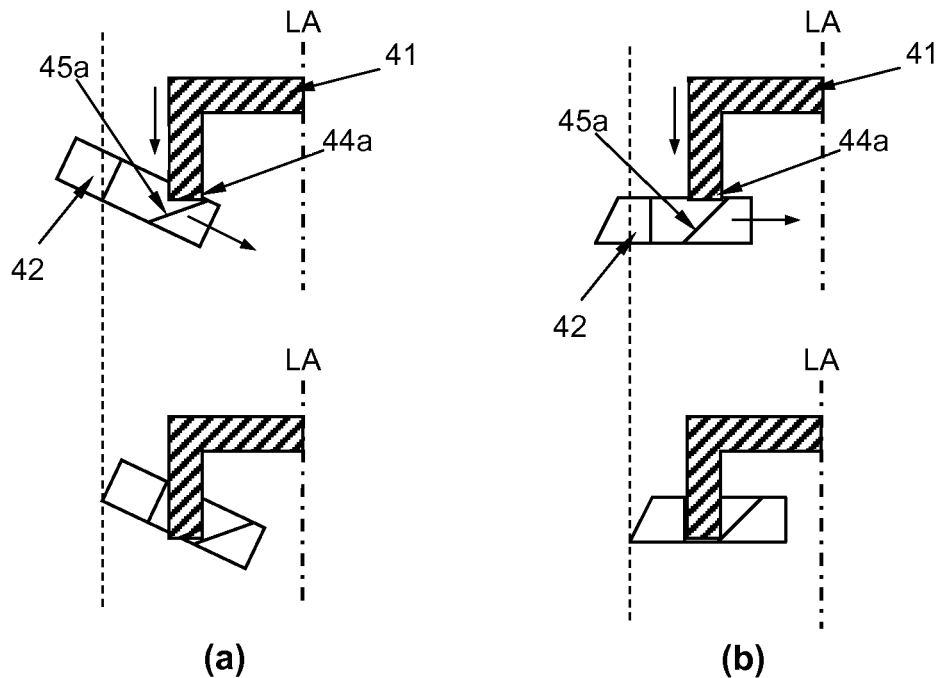
FIG. 7 shows examples of a locking member with releasing means acting on the locking means for illustration of the operating principle of the locking procedure.

FIG. 7 shows two different examples for illustration of the cooperation of the releasing means 41 with the locking member 42, wherein in figure (a), a locking member arranged in an inclined manner, and in figure (b), a locking member being substantially arranged horizontally are used.

In both cases, the locking member 42 has a recess 45 running diagonal with respect to the longitudinal axle of the locking member, which is delimited inwards by a slanted side wall 45a.

In the two upper figures, a locking member 42 is shown respectively, which is in a locking position. An end portion 44a of the slot 44 of the releasing means 41, here, rests on the upper end of the slanted side wall 45a. During moving the releasing means 41 along the longitudinal axle LA of the axle adapter downwards, the locking member 42 of the releasing means 41 has to evade in that the end portion 44a slides downwards along the slanted side wall 45a, whereby the locking member 42 is displaced radially inwards.

In the two lower figures, the releasing means 41 is displaced downwards completely and has reached its end position, whereby the locking members 42 are in a releasing position. In the releasing position, the locking members 42 only protrude slightly or not at all from the respective through hole of the side wall 21 of the axle adapter 20.

When the releasing means 21 is moved upwards again, the locking members 42 move radially outwards again being, for example, effected by the spring force of a spring member not shown here.

The lower end portions 44a of the slot 44 may be slanted at the inner side, whereby the slanted portion substantially runs parallel to the slanted side wall 45a. Thereby, the physical effort required for the displacement of the releasing means 41 along the longitudinal axis LA downwards is minimized or optimized. The slanted side wall 45a may additionally be provided with a lubricant, in order to reduce the friction between the end portion 44a of the slot 44 and the slanted side wall 45a.

Figure 8:
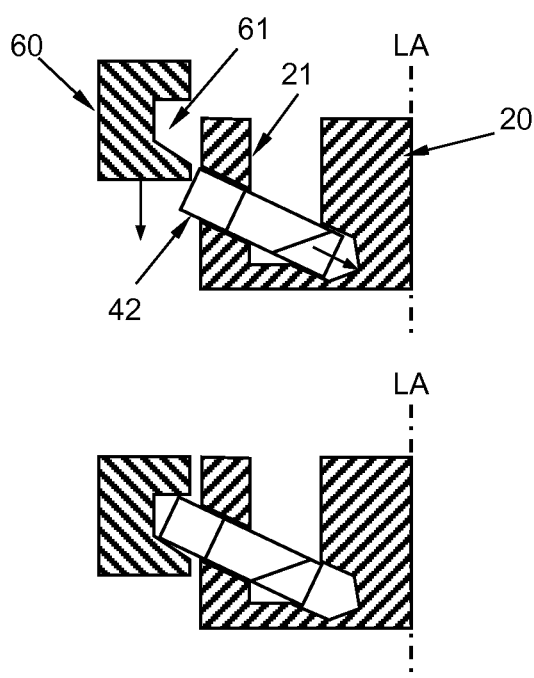
FIG. 8 shows an axle adapter with a locking member arranged therein for illustration of the operating principle of the locking procedure.

FIG. 8 shows a cross section through an axle adapter 20 and a wheel 60 for illustration of the operating principle of the axial locking means during fitting of the wheel onto the axle adapter.

In the example shown here, the through hole 22 in the side wall 21 of the axle adapter 20 is inclined by a certain angle with respect to the transverse axle of the axle adapter outwards such that the locking member 42 arranged within the through hole during releasing is pushed radially oblique inwards.

In the upper illustration of FIG. 8, the wheel 60 is in a start position of the mounting procedure. A lower portion or a portion of the wheel 60 facing the carriage axle is pushed against the external bottom face of the locking member 42, which is inclined due to the slanted arrangement of the locking member 42 in a certain angle with respect to the wheel 60. By the fitting of the wheel 60 onto the axle adapter 20, the wheel 60 pushes against the locking member 42, whereby the latter is pushed or displaced radially oblique inwards.

As soon as the wheel 60 has been fitted completely on the axle adapter 20, the locking member 42 is pushed again radially oblique outwards, being effected by the spring not shown here, and is pushed into a recess provided at the inner wall of the wheel. As soon as the locking member 42 engages with the recess 61, the wheel 60 is locked axially such that a release of the wheel from the axle adapter without manipulating the releasing means no longer is possible.

Figure 9:
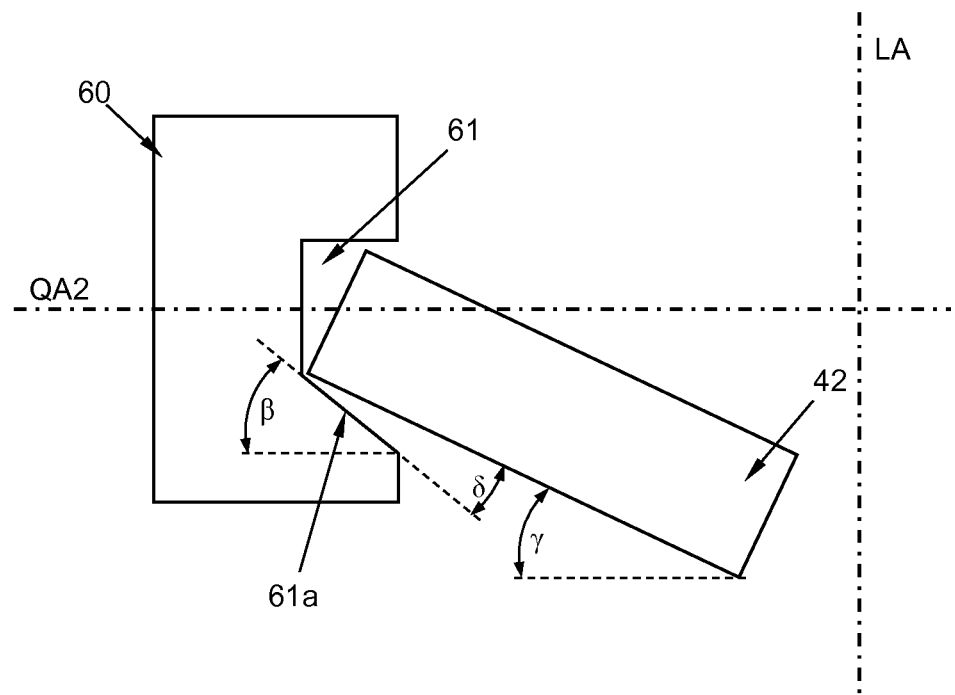
FIG. 9 shows a cross section through a wheel and a locking member engaging with the recess of the wheel.

FIG. 9 shows a preferred arrangement of the locking member 42 relative to the wheel 60, as well as a preferred configuration of the recess 61 in the wheel 60.

The wheel 60 has, at an inner wall, an at least partially circumferential recess 61, which is delimited laterally by two side walls. The axially internal side wall or the side wall 61a facing the carriage axle is inclined by a first angle β with respect to the transverse axis QA2 of the wheel such that the axially internal side wall 61a forms an inclined surface. The first angle β is smaller than 90°.

The locking member 42, which here is configured as a cylindrically shaped bolt or pin, is inclined by a second angle γ with respect to the transverse axis QA2 of the wheel 60, whereby the first angle β is larger than the second angle γ such that the locking member 42 is positioned in an angle δ with respect to the axially internal side wall 61a. The angle δ, i.e., the difference between the first angle β and the second angle γ, is selected such that a force fit results between the axial internal side wall 61a and a locking member 42 in a locking position, preventing a releasing of the wheel 60 from the axle adapter 20. I.e., the angle δ between the internal side wall 61a and the locking member 42 is selected such that a self-retention results between the locking member 42 and the side wall 61a. Moreover, the angle δ is to be selected such that the spring force of the spring member not shown here acting on the locking member 42 is sufficient to insert the locking member 42 along the internal side wall 61a into the recess 61.

By the slanted arrangement of the locking member 42, the external bottom face of which also is inclined by a certain angle, and by the angle δ between the internal side wall 61a and the locking member 42, the wheel can be pushed onto the axle adapter without the releasing means 41 having to be operated, by means of which the locking members 42 may also be pushed radially inwards. For the mounting of the wheel 60, the latter has only to be pushed onto the axle adapter 20 until the locking members 42 engage or lock into the recess 61. For this, neither a tool is necessary, nor has the locking member 42 to be operated.

In order to release the wheel 60 again from the axle adapter 20, the releasing means 41 has to be pushed, whereby the locking members are pushed radially inwards or pulled out of the recess 61, as explained with reference to FIG. 7.

Further, by the arrangement of the locking member 42 shown in FIG. 9 and the specific configuration of the at least partially circumferential recess 61, it is ensured that the wheel 60 fitted on the axle adapter 20 has no axial clearance.

Figure 10:
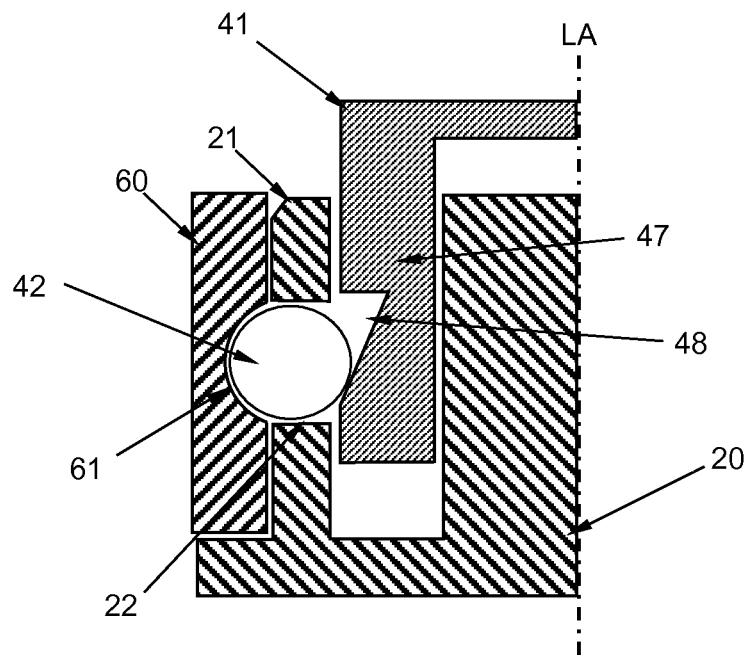
FIG. 10 shows an example of a quick change means according to the invention with balls as locking members.

FIG. 10 shows an alternative configuration of a quick change system according to the invention. In contrast to the quick change systems described above, in the embodiment shown in FIG. 10, a ball is provided instead of a pivot or bolt as locking member 42.

The ball 42 is arranged in the through hole 22 of the side wall 21 of the axle adapter 20, whereby the through hole preferably is configured such that the ball 42 may not fall out of the through hole 22 radially outwards.

The at least partially circumferential recess 61 at the inner wall of the wheel 60 has a substantially semi-circular cross section, the radius of which substantially corresponds to the radius of the ball. During fitting of the wheel onto the axle adapter 20, the ball 42 is pushed radially inwards, whereby with respect to the embodiment of a releasing means 41 shown here, the latter also during mounting of the wheel 60 has to be pushed, in order to enable a displacement of the ball radially inwards by the wheel.

As soon as the wheel has reached the final mounting position, the ball 42 is displaced in the recess 61 with the aid of the releasing means 41 such that the wheel 60 is locked axially. For displacing the ball 42 in the recess 61, the releasing means 41 is moved outwards in axial direction, being accomplished, for example, by a spring member assigned to the releasing means 41.

For releasing, the releasing means is pushed inwards in axial direction, whereby a recess 48 in the side wall 47 of the releasing means 41 releases the ball 42 such that the latter is pushed radially inwards, when the wheel 60 is pulled off the axle adapter 20. The recess 48 in the side wall 47 is configured such that the depth of the recess increases to the outside in axial direction such that a substantially wedge shaped recess 48 is formed.

In alternative embodiments not shown here, as locking members 42, also hooks or magnets may be provided. A hook as locking member 42 may be supported in the through hole 42 at a rotation axle, whereby during locking, the hook is rotated outwards around this rotation axle, and engages into a recess 61 of the wheel 60 with a hook member. The side wall 47 of the releasing means 41, thereby, may be configured as will be shown with reference to FIG. 10. As the releasing means 41 is pushed axially inwards, the recess 48 in the side wall 47 forms an area, in which the hook during release is accommodated. During moving of the releasing means 41 in opposite direction, the hook is pivoted out of the through hole 22 again, and is held in the locking position by the lower portion of the side wall 47.

FIG. 11 shows various configurations of a side wall 21 of an axle adapter 20 or various configurations of an inner wall or a rear portion of an inner wall of a wheel. The rear portion of the wheel, hereby, corresponds to the side wall 21 of the axle adapter 20 such that the wheel 60 is locked radially, i.e., the wheel 60 is not rotatable about the longitudinal axle of the axle adapter relative to the axle adapter.

With respect to the configuration shown in figure (a), the side wall 21 has a substantially circular external profile, whereby a radial pivot is provided at one location of the side wall, which engages in a radial groove of the wheel 60. This configuration specifically is advantageous, if the locking members 42 are arranged irregularly in circumferential direction of the axle adapter 20, and the wheel 60, therefore, may only be fitted on the axle adapter 20 in a single defined position.

Figure (b) shows an axle adapter 20, according to which the side wall 21 has an elliptical or oval outer contour. According to this configuration, the wheel 60 may be fitted onto the axle adapter 20 in two different positions.

In figure (c), an axle adapter 20 is shown, the side wall 21 of which has a substantially rectangular outer contour.

The figure (d) shows an axle adapter 20 having a side wall 21, which has an outer contour in form of a gear wheel or of tooth systems.

The figure (e) shows an axle adapter 20 having a side wall 21, which has a substantially triangular outer contour, whereby the corners are chamfered.

Other outer contours of the side wall 21 of the axle adapter 20, for example, various polygon shapes, are possible as far as these are suitable for preventing a rotation of the wheel 60 on the axle adapter 20 relative to the axle adapter.

According to an embodiment of a quick change system according to the invention not shown here, the wheel 60 may be screwed onto the axle adapter 20 by means of a threading.

Figure 12:
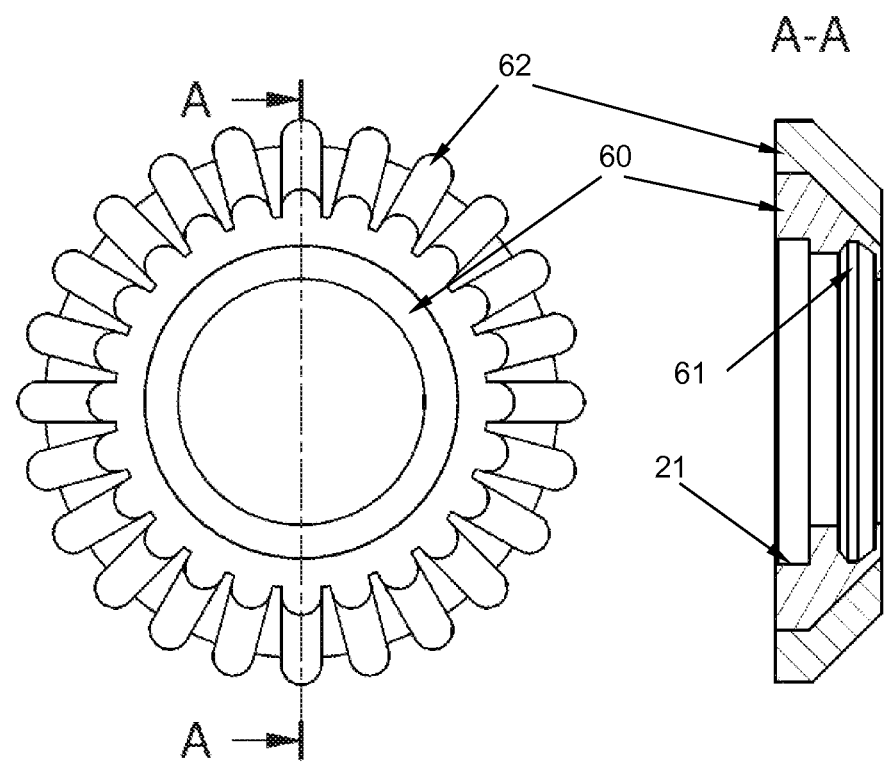
FIG. 12 shows an example of a tire on a wheel.

FIG. 12 shows an example of a tire 62 at a wheel 60 in a front view and in a side view along a sectional axis A-A.

Here, the tire 62 is configured such that the latter is suited specifically for pipes or conduits having a smaller diameter. For this, the tire has a slanted tire shoulder, which has a certain width. During the traveling on a conduit having a smaller diameter, the tire shoulder basically forms the tread of the tire, while during traveling on a conduit having a larger diameter, the face adjacent to the tire shoulder radially outwards serves as tread.

In the sectional view, the portion of the wheel 60 facing the carriage axle is shown, which is adapted to the side wall 21 of the axle adapter in its shape, and thus, prevents a rotation of the wheel about the longitudinal axis of the carriage axle relative to the axle adapter. This portion in an axial outwards direction is followed by the circumferential recess 61, with which the locking members may be brought into engagement.

The tire 62 may be made from a rubber or a preferably wear resistant plastics material. The tire may also have another tread profile than the one shown in FIG. 12.

The invention claimed is:

1. A quick change system (30) for carriage wheels, comprising:
   an axle adapter (20) and a locking means (40) for axial locking of a wheel (60) on the axle adapter, wherein
   the locking means (40) comprises at least one locking member (42) and a releasing means (41) cooperating with the locking member, wherein the at least one locking member axially locks the wheel on the axle adapter in a locking position, and
   the releasing means (41) and the at least one locking member (42) cooperate such that by moving the releasing means, the at least one locking member (42) can be brought from the locking position into a releasing position, in which the wheel (60) is released axially,
   wherein the releasing means (41) forms a push button for axial release of the wheel (60) on the axle adapter (20), whereby upon pressing the push button, the locking members (42) can be brought from a locking position into a releasing position.

2. The quick change system according to claim 1, wherein the releasing means can be moved in axial direction along the longitudinal axis (LA) of the quick change system.

3. The quick change system according to claim 1, wherein in a side wall (21) of the axle adapter (20), at least one through hole (22) is provided, in which the locking member (42) is arranged movably relative to the through hole, wherein the locking member in the locking position at least partially protrudes from the through hole, and thereby, axially locks the wheel (60).

4. The quick change system according to claim 1, wherein the locking member (42) comprises a pin, a pivot, at least one ball, a hook, or a magnet.

5. The quick change system according to claim 4, wherein the pin or the pivot (42) has at least one wall-sided recess (45), which substantially runs transverse with respect to the longitudinal axis (LA2) of the pin or the pivot (42).

6. The quick change system according to claim 5, wherein the wall-sided recess (45) has a slanted side wall (45*a*), which is arranged in an angle ($\alpha$) with respect to the transverse axis (QA) of the pin or the pivot (42).

7. The quick change system according to claim 5, wherein the releasing means (41) is formed as releasing cap with a circumferential side wall (47), wherein the releasing means (41) can be arranged relative to the axle adapter (20) such that the side wall (47) of the releasing cap is arranged at least partially within the side wall (21) of the axle adapter (20), and such that the releasing cap is movable in axial direction along the longitudinal axis (LA) of the quick change system relative to the axle adapter (20).

8. The quick change system according to claim 7, wherein at least one edge-sided slot (44) is provided in the side wall (47) of the releasing cap (41), with which the pin or the pivot (42) can be brought into engagement in the area of the wall-sided recess (45) of the pin or the pivot.

9. The quick change system according to claim 8, wherein the releasing cap (41) and the pin or the pivot (42) cooperate such that during moving the releasing cap in axial direction, an end portion (44*a*) of the slot (44) acts on a slanted side wall (45*a*) of the wall-sided recess (45) of the pin or the pivot (42), and thereby, moves the pin or the pivot (42) radially inwards.

10. The quick change system according to claim 1, wherein a spring member (43) is assigned to the locking member (42), the spring force of which pushes the locking member (42) radially outwards.

11. The quick change system according to claim 4, wherein the ball (42) in the locking position engages with a recess (61) at the inner wall of the wheel (60).

12. The quick change system according to claim 11, wherein a recess (48) is provided at the outer wall of the side wall (47) of the releasing means (41), wherein the depth of the recess (48) increases in axial direction, and wherein the ball (42) can be brought into engagement with the recess (48).

13. The quick change system according to claim 12, wherein upon axial movement of the releasing means (41) relative to the axle adapter (20), and
   in direction to shallower depth of the recess (48), the ball (42) can be brought into the releasing position, and
   in direction to greater depth of the recess (48), the recess (48) causes movement of the ball (42) into the locking position.

14. The quick change system according to claim 1, wherein the side wall (21) of the axle adapter (20) has an external profile corresponding, up to a certain height, to an internal profile of the wheel (60), and prevents a rotation of the wheel about the longitudinal axis (LA) of the quick change system relative to the axle adapter.

15. The quick change system according to claim 14, wherein the external profile is formed elliptically, in a polygon shape, triangular or multi-angular, star shaped, gear-wheel shaped, or round with a radial feather key.

16. The quick change system according to claim 1, wherein the quick change system is provided for or can be utilized for carriage wheels of an inspection vehicle (10).

17. A wheel (60) for a quick change system (30) according to claim 1, wherein the wheel at an inner wall has an at least partially circumferential recess (61), with which the locking members (42) of the quick change system can be brought into engagement and axially lock the wheel, when the wheel is pushed axially onto the axle adapter (20) of the quick change system.

18. The wheel according to claim 17, wherein the recess (61) has a substantially semi-circular cross section.

19. The wheel according to claim 17, wherein the circumferential recess (61) has two opposing side walls, wherein an axially internal side wall (61*a*) of the two side walls is inclined by a first angle ($\beta$) with respect to the transverse axis (QA2) of the wheel (60), which is smaller than 90°.

20. The wheel according to claim 19, wherein the locking member (42) of the quick change system (30) is inclined by a second angle ($\gamma$) with respect to the transverse axis (QA2) of the wheel (60), and wherein the first angle ($\beta$) is larger than the second angle ($\gamma$).

21. The wheel according to claim 20, wherein the difference ($\delta = \beta - \alpha$) between the first angle ($\beta$) and the second angle ($\gamma$) is selected such that in a locking position, a force fitting is effected between the axially internal side wall (61*a*) and the locking member (42), which prevents a loosening of the wheel (20).

22. The wheel according to claim 17, wherein the side of the wheel facing the axle adapter (20) has an internal profile corresponding to the external profile of the axle adapter (20), and prevents a rotation of the wheel about the longitudinal axis (LA) of the quick change system (30) relative to the axle adapter.

23. An inspection vehicle (10) having a number of quick change systems (30) according to claim 1.

24. The inspection vehicle according to claim 23, wherein the quick change systems (30) are attached to wheel axles (12) of the inspection vehicle.

25. The inspection vehicle according to claim 24, wherein the quick change systems (30) are attached to the wheel axles (12) releasably.

26. The inspection vehicle according to claim 23, wherein a radial pivot (13) is arranged at an end portion of the wheel axle (12), which can be brought into engagement with a corresponding recess of the axle adapter (20) of the quick change system (30), and which prevents a rotation of the quick change system about the longitudinal axis of the wheel axle relative to the wheel axle.

* * * * *